May 5, 1959
F. SALTZ
2,884,852
PRINTER CARRIAGE CONTROL MEANS
Filed July 13, 1956
7 Sheets-Sheet 1
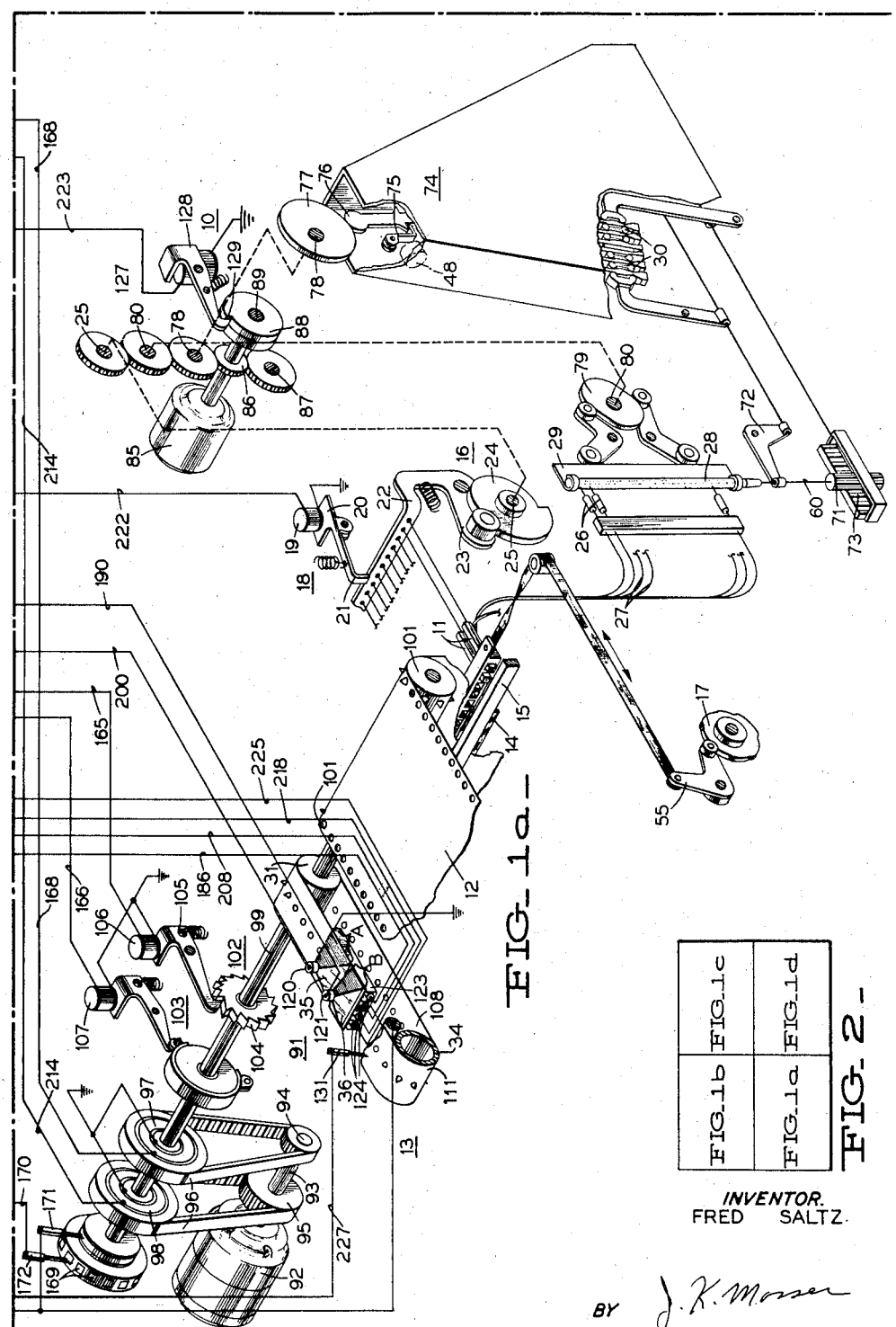
INVENTOR.
FRED SALTZ.
BY J. K. Mosser
AGENT

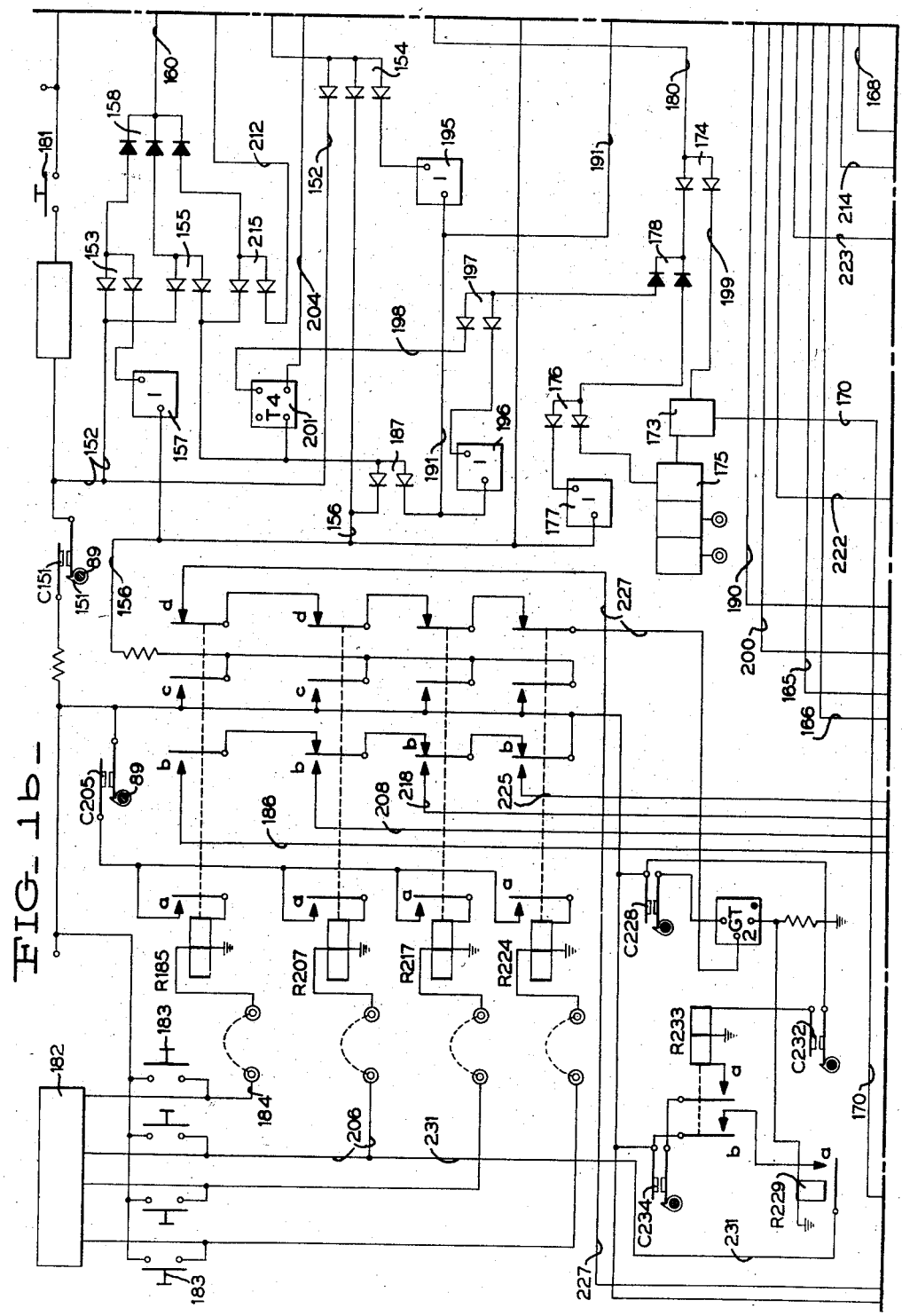
FIG_1b_

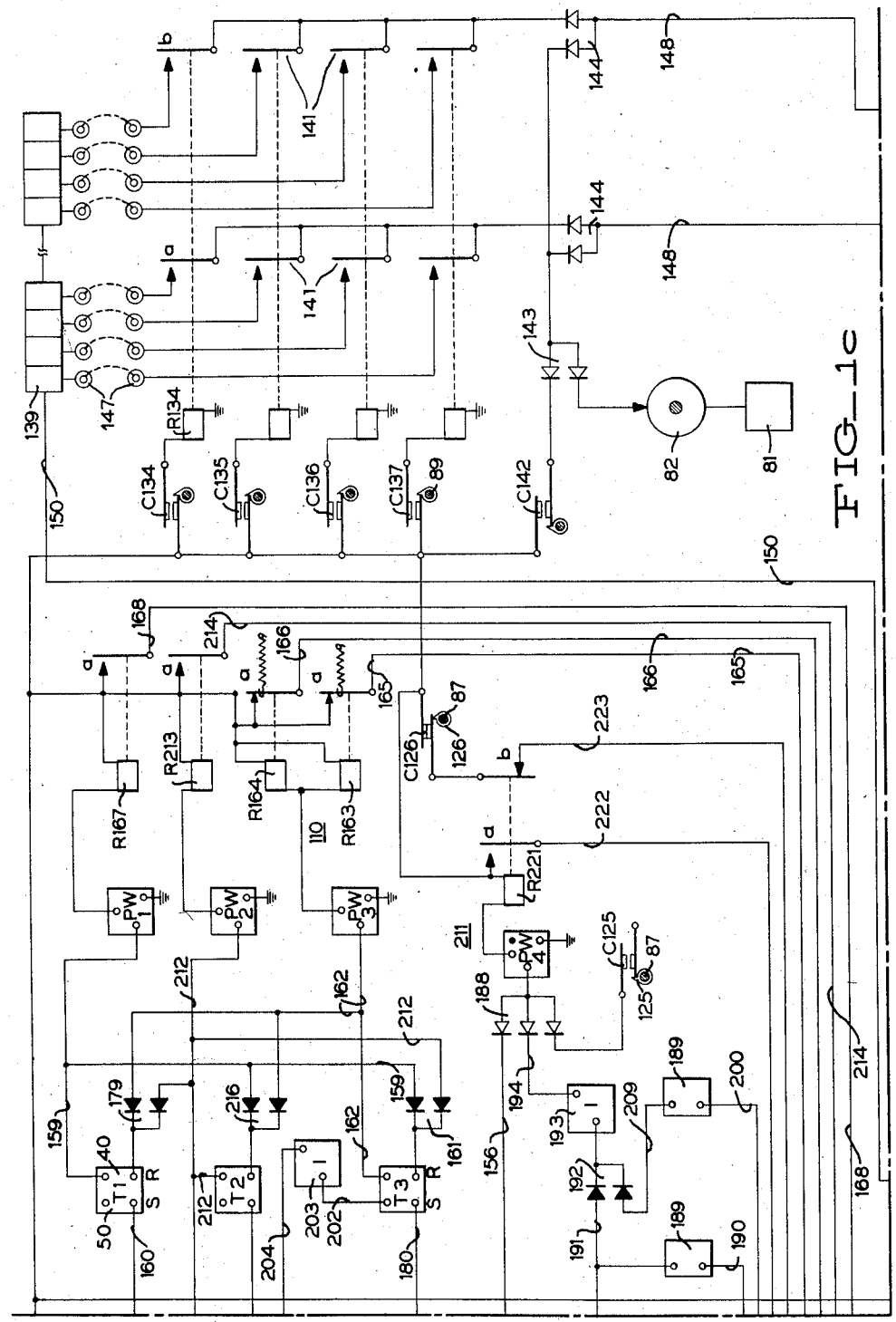

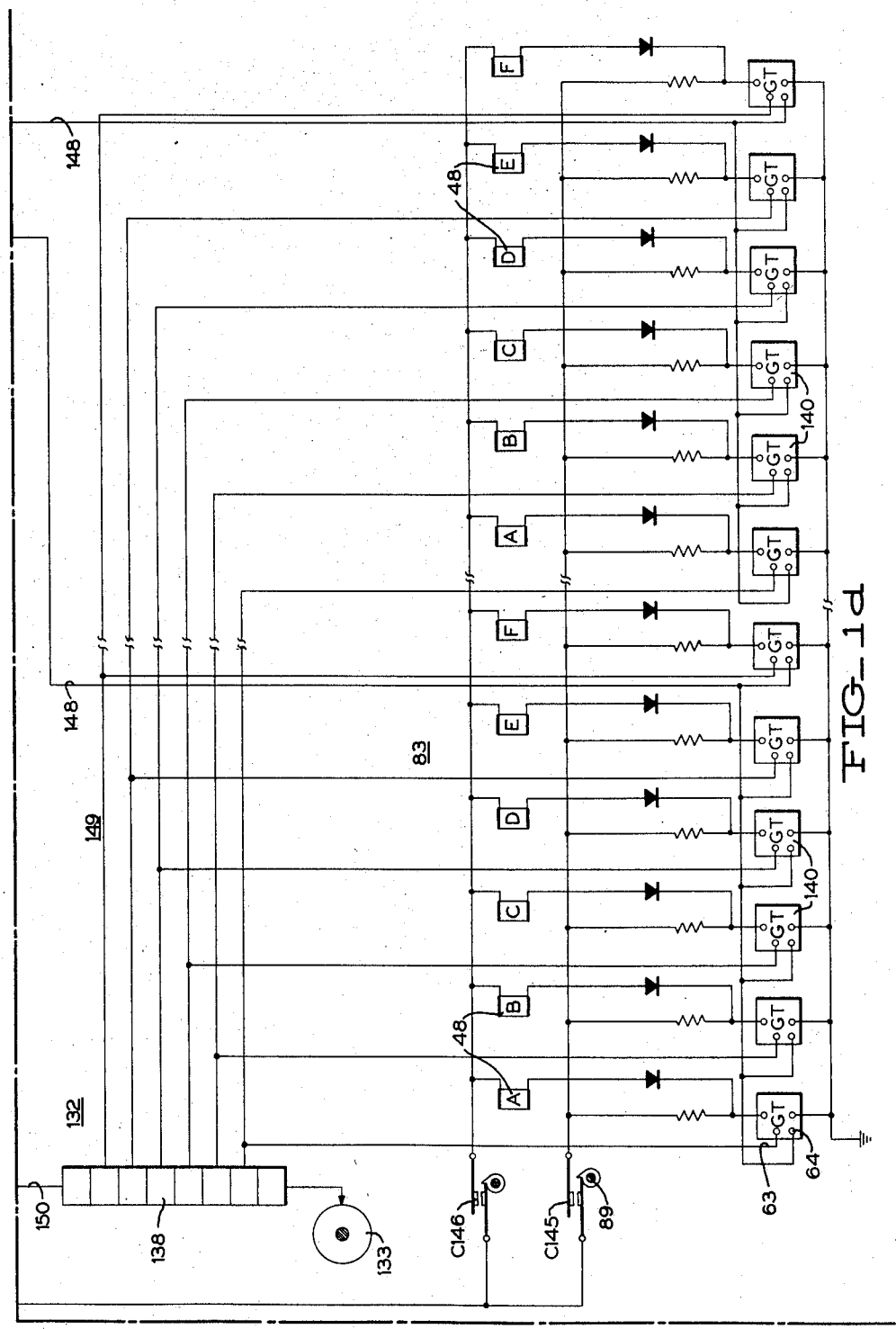

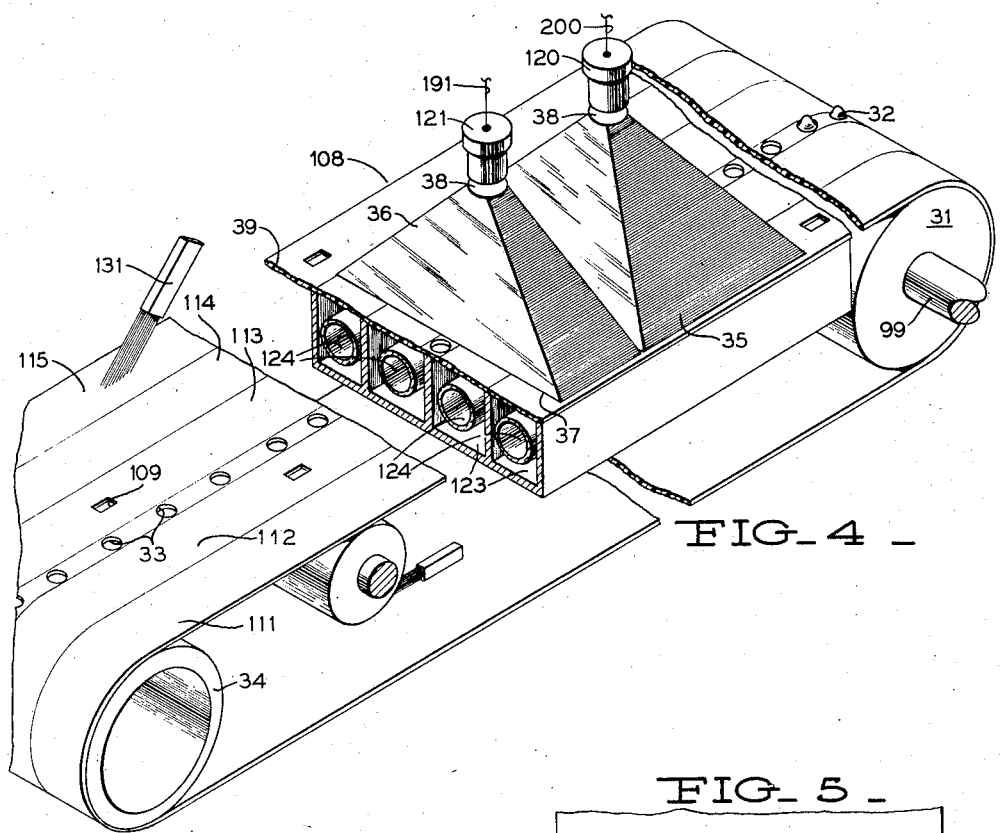
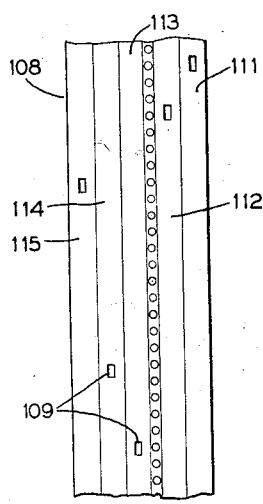
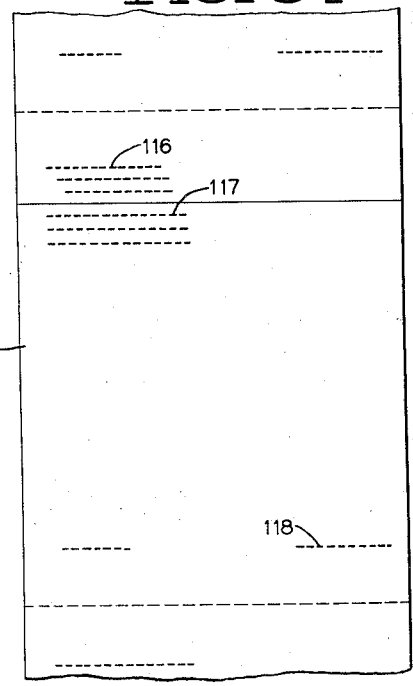

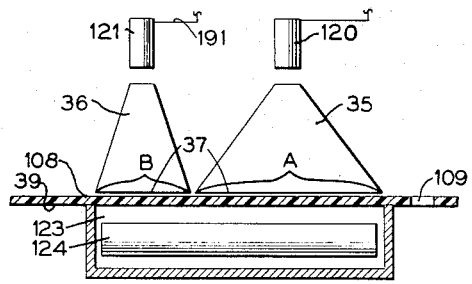
FIG_7
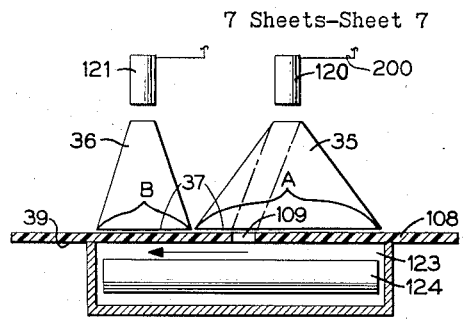
FIG_9
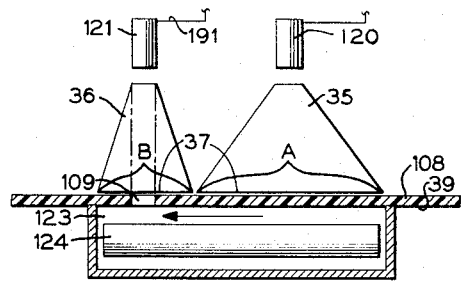
FIG_8
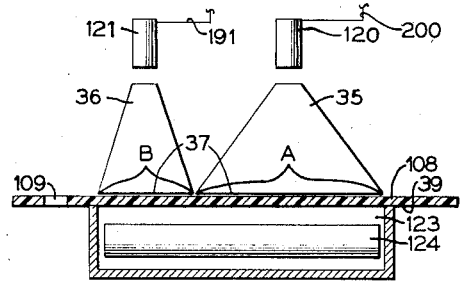
FIG_10
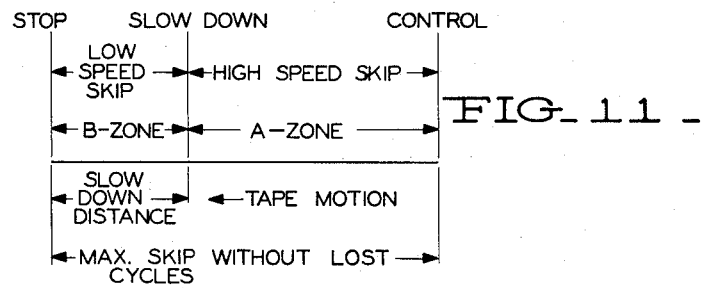
FIG_11
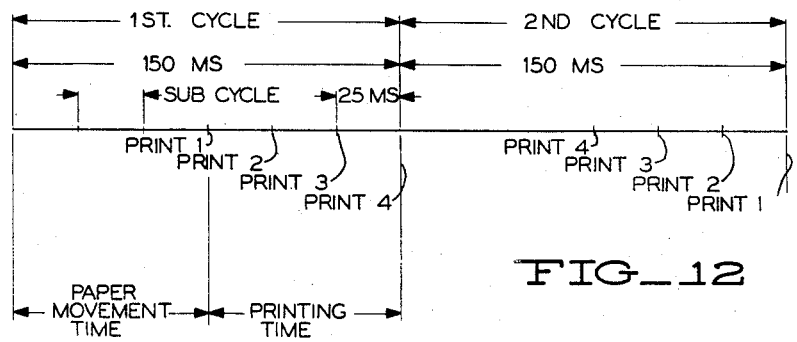
FIG_12

United States Patent Office 2,884,852
Patented May 5, 1959

2,884,852
PRINTER CARRIAGE CONTROL MEANS

Fred Saltz, Binghamton, N.Y., assignor to International Business Machines Corporation, New York, N.Y., a corporation of New York Application July 13, 1956, Serial No. 597,763

15 Claims. (Cl. 101—93)

The invention relates to sensing devices and more particularly to light sensing devices for detecting the presence of a light indication within preselected areas.

It is one of the prime objects of the invention to provide a phototube light sensing control means which eliminates the necessity for elaborate memory or information storage facilities.

It is another object of the invention to provide a phototube with a light guide having a predetermined light responsive area which provides the information storage medium for any selected light spot passing thereby.

It is still another object of the invention to provide a record feeding carriage including a controlling tape therefor with a light responsive control means which provides minimum wear of the tape by having no contact therewith.

It is yet another object of the invention to provide a phototube control with a light guide which provides for continuous scanning of preselected areas for a controlling indication.

It is yet another object of the invention to provide a phototube control arrangement with a light gathering and directing device therefor which continuously conducts a light conducting spot thereto when the light conducting spot is lying within a preselected area.

It is yet another object of the invention to provide a record feeding carriage with a control tape and a phototube control including a light guide therefor which continuously scans preselected tape areas for a control indication.

It is another object of the invention to provide a record feeding device with a light sensitive phototube control which continuously detects and follows a light indication within preselected areas for controlling the record feeding operation.

It is still another object of the invention to provide a multispeed record feeding device with light sensitive control means which scans preselected controlling areas for a control indication to selectively advance the record at one of a plurality of speeds.

It is another object of the invention to provide a record feeding carriage with control tape and a phototube light sensitive device and light guide therefor which continuously scans preselected areas of the tape to control the operation of the carriage and associated mechanisms.

It is still another object of the invention to provide an improved light sensitive control means for advancing continuous form material under control of a form feeding control tape having selected controlling areas which accelerates and decelerates the forms at high speed.

It is another object of the invention to provide a cyclically operated printer with a tape controlled record feeding carriage having a phototube light sensitive control means which predetermines the number of subcycles the printer must be delayed during a long record feed to maintain maximum printer output.

One application for the improved light guide and phototube control combination would be with high speed printing devices, such as multiheaded wire printers, stick printers or the like, wherein it is necessary to provide means for advancing record material rapidly at both line space and eject speeds in order to obtain maximum printer output. The number of printing heads or positions are spaced on some multiple to provide a serial-parallel printing type operation. A serial-parallel type of printer may be defined as a print unit in which each type member prints more than one character for each line of printing.

In the serial-parallel method of printing, the print unit must be able to operate at greatly increased speeds. The rate of operation is proportionate to the number of characters each print position must print on one line. For example, a line having 120 character positions may be provided with 60, 40, 30, 24, 20, and so forth, wire printing heads. With a 30-print head printer, each print head must make four successive impressions to complete the printing of a line of data.

In order to read and print a line of data and then line space the record to its next data receiving position consumes a predetermined amount of time which may be defined as a cycle of operation or printing cycle. This printing cycle may be divided into a predetermined number of fixed subcycles.

In the example to be given, operation of the record feeding carriage at normal slow speed takes place at approximately twenty-five inches per second which is equivalent to 500 lines per minute and high speed skipping or eject operation occurs at approximately seventy-five inches per second or 1,500 lines per minute. Slow speed operation of the carriage is called upon to single, double or triple line space or to skip up to 1⅙ inches of the record and the high speed operation is called upon to advance the record for skips over 1⅙ inches to 3½ inches in length. Under these conditions, sufficient time is available to move the record the required distance without interrupting the normal printing operation.

During conditions where long skips or eject operations are called for, the record will not have sufficient time to reach the desired position or line for printing. Therefore, skips or ejects in excess of 3½ inches will interrupt printer operation for a number of subcycles equal to that required by the record or form movement. This action prevents the first and subsequent impressions from being made while the form is still moving and thereby eliminates misalignment of the line of type.

This invention is directed to a light sensitive carriage and printer control means operative to control record feeding movement and interrupt the printing operation in the event the desired line on the record cannot reach the proper position in time to permit printing at the beginning of the next printing cycle. In the embodiment disclosed, a wire printer, operating on fixed subcycle timing, is provided and includes a record feeding carriage having a control means associated with a channeled endless tape having a plurality of control punches, spots or the like adapted to control the various skip, eject and other printer operations. This control means may include a pair of fixed or stationary light gathering and conducting tubes or guides having preselected light collecting or input areas disposed in proximity to the portion of the tape located thereat. Associated with each light guide is a light responsive device or photoelectric cell which responds to a selected control perforation in the tape lying in the related interrogation area to advance the carriage at one of two speeds. This selective speed advance of the carriage and record will occur without loss of any printing subcycles. When a high speed, long skip and eject instructions are detected in one of the channels requiring more than the normal allotted time for record movement to position the selected line for printing, the photoelectric cell selecting means cooperates to disconnect or disable the printing mechanisms. Disconnection of the printing mechanisms prevents set up of the printing devices or code rods.

With the printer operation interrupted, carriage movement continues at high speed and the subcycle timing remains fixed. As the control spot in the selected channel in the tape, indicating the location of the desired line, enters a first area encompassed by one of the light guides, it directs the light to the related photoelectric cell during the entire time the control spot is in this area and a signal is transmitted to indicate that the desired line on the record will reach the print receiving position within some predetermined time limit. While the form is still advanced at high speed, the printer control cams and the like are conditioned to be relatched to the drive means at the beginning of the next timed subcycle. When this point is reached, printer operation is again initiated and the setup of the first character at each print head is started. As the selected control spot in the tape passes from the first area, it enters a second control area encompassed by the other light guide. This guide conducts the light to its related photoelectric cell during this interval, whereat a second signal is generated to terminate the high speed carriage operation and to decelerate the carriage, form and control tape to low speed.

The record movement continues to advance at low speed until the selected control spot leaves the second control area, after which the carriage is braked to a stop. The timing of the setup mechanism and stopping of the record at the desired line is such as to have the first subcycle printing operation take place shortly after the record reaches a stop. Once the printing of a line of data is initiated, all subsequent subcycle printing operations follow at fixed time intervals and the timing is such as to ignore the previously lost subcycles.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1a to 1d show an exploded diagrammatic isometric view of one form of printer and a schematic wiring diagram having the improved subcycle control means applied thereto.

Fig. 2 is a diagram showing the arrangement of Figs. 1a to 1d.

Fig. 4 is an enlarged diagrammatic isometric view of the multichanneled tape and improved light responsive pickup means shown in Fig. 1a.

Fig. 5 is a view of a sample record or form on which data is to be printed.

Fig. 6 is a developed view of a typical control tape for the form shown in Fig. 9.

Figure 3:
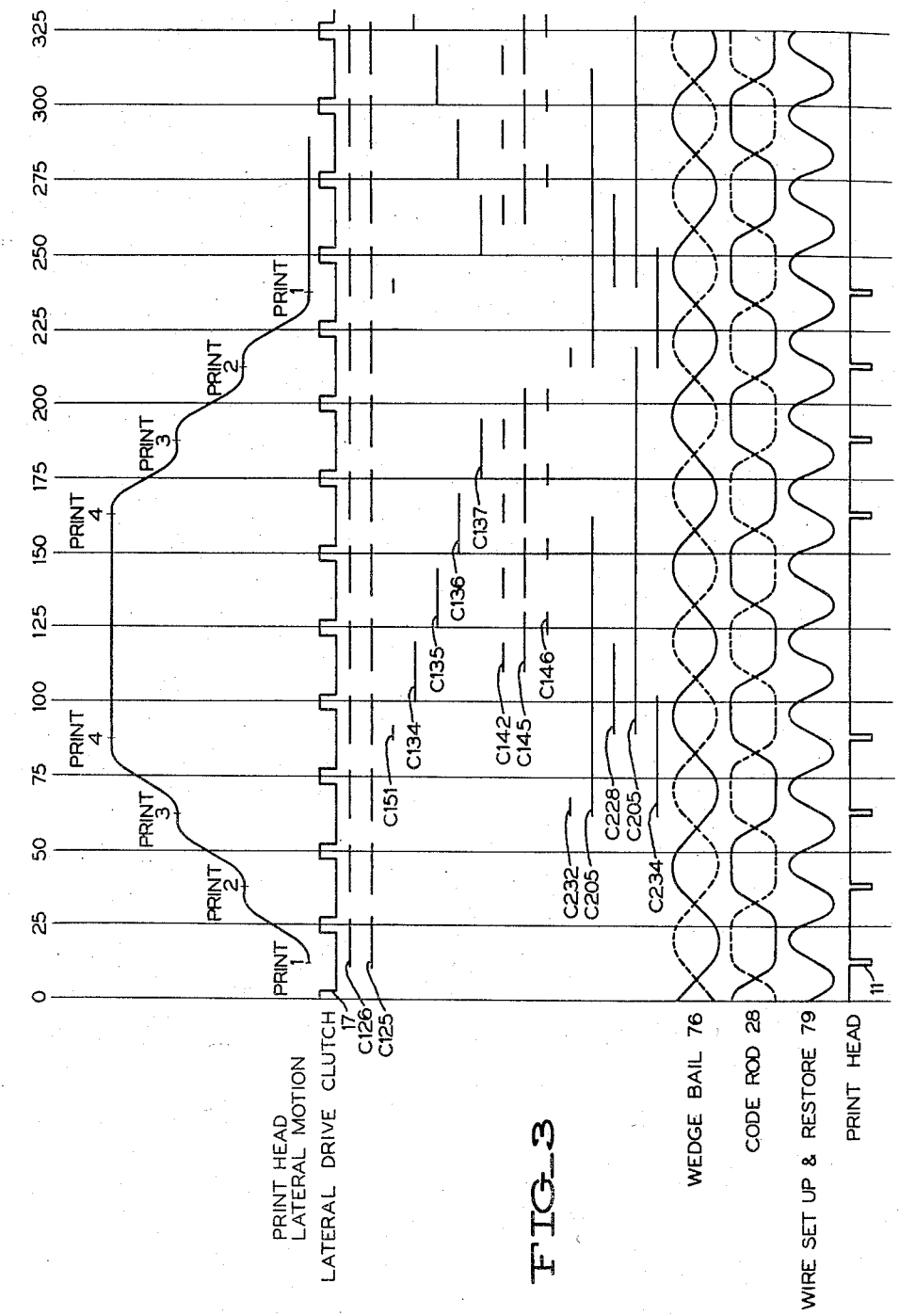
Fig. 3 is a timing diagram for a normal printing cycle showing the various cam contact and print head operations.

Figs. 7 to 10, inclusive, are diagrammatic views of the improved light responsive means with a control perforation at different locations.

Fig. 11 is a timing diagram for a complete printing cycle.

Fig. 12 is still another timing diagram of the paper motion.

*Tubes and control switches*

In each of the drawings of the various control devices, the individual components or units making up that device are indicated merely as a box or block. The circuitry of such blocks will only be generally described as applied to various typical forms of tubes and diode circuits. A more detailed description of typical diode coincident switches, diode mixes, inverters, triggers, power tubes, heated gas tubes and any required cathode followers or the like which would be applicable to apparatus of this type is shown and described in O. B. Shafer et al. application, Serial No. 469,592, filed November 18, 1954, and assigned to the assignee of the present application.

For the purpose of this description, a typical coincidence switch 153, Fig. 1b, otherwise known as a logical And circuit or diode switch comprises germanium crystal diodes, each including an individual input terminal, normally biased negative so that the common terminal is normally at a negative potential with respect to ground. If coincident positive pulses are applied to all input terminals, the potential of the output terminal is raised. However, if only one of the input terminals is pulsed positively, the potential of the common output terminal is not raised appreciably. Any voltage responsive device, such as a suitable trigger T, Fig. 1c, or the like, may be controlled by the potential of the output terminal to furnish a usable output voltage pulse whenever a coincidence of positive input pulses is detected.

A typical mixer 158, Fig. 1b, otherwise known as a logical Or circuit or diode mix, comprises a pair of germanium crystal diodes. The diodes employed in mixers are shaded and the direction reversed in the present drawings to distinguish them from the diodes which are employed in the switches. A voltage responsive device, represented by a trigger T, Fig. 1c, is controlled by the potential of a common output terminal of the diodes, which terminal is connected by a suitable resistor to a negative voltage source (not shown) to normally maintain a negative bias in the related grid of the tubes. Each diode is connected to an individual terminal which in turn is connected in the electrical circuit. If either one, or all, of the diode input terminals is pulsed positively, the potential of the output terminal is raised which permits the tube associated therewith to conduct or operate in a predetermined manner.

Referring momentarily to Figs. 1b to 1d, inclusive, which represent diagrams of the control circuits, each of the component blocks or units, comprising a particular tube circuit, is labeled with a letter or combination of letters. The respective general or objective circuitry of most of the component blocks may be determined by identifying the letter-number block designation. Each particular letter combination in the component block, in addition to acting as a reference designation, also denotes the function of the component. Thus for example, a typical power unit or inverter is labeled with the prefix letter I; a trigger unit is labeled with the prefix letter T; a power amplifier unit is labeled with the prefix letters PW; and a gas tube or thyratron unit is accordingly labeled with the prefix letters GT.

Hereinafter in this specification wherein a conductor or a circuit terminal or the like is referred to as being shifted positive or negative in potential, this does not necessarily mean that the point in question is positive or negative in an absolute sense, but only more positive or more negative, relative to its previous state. This principle also applies to any description wherein positive and negative pulses are mentioned or referred to as up or down or raised or lowered.

Generally, an inverter or amplifier unit I comprises a triode having its cathode connected to ground. An inverter, as its name implies, is adapted to invert a signal. Thus, if its grid terminal shifts positive, the triode conducts more heavily and the associated plate output terminal shifts negative. Similarly, if the grid terminal shifts negative, the output terminal shifts positive.

Power amplifiers or units PW effect 180° signal inversion of an applied signal so that they may also be classified as inverters. However, they differ from the inverter units, which are primarily voltage devices, in that they can supply considerable power to the circuits to which they are connected. In Fig. 1c the PW units comprise a triode tube wherein the application of a positive signal to the grid input terminal results in heavy conduction from a positive voltage source through the plate circuit and a series connected relay coil to induce a magnetic flux therein for purposes to be hereinafter described.

The trigger unit T shown is conventional in construction and comprises two retroactively coupled triode sections. By proper selection of circuit components, the unit is so arranged that only one of the triode sections is conductive at a time in accordance with a well-known trigger operation. With the first-hand triode 40 conducting, Fig. 1c, the trigger is defined as being in an Off or reset position. With the trigger Off, the output terminal of the right-hand triode is at some potential below the supply positive potential due to the current being drawn through the right-hand triode. As a result, voltage sensitive circuits which may be connected to this terminal are accordingly controlled. With the trigger Off, as assumed, the plate and output terminal of the nonconducting left-hand triode 50 is approximately at the positive supply potential.

The trigger shown utilizes a positive-going input, selectively applied to the terminals S and R to flip the trigger from its Off to reset to its On or set position and vice versa. Retroactive action between the related triodes is very rapid so that in effect the application of the positive shift to the terminal S almost instantaneously initiates the "flipping" of conduction from the right to the left-hand triode. A positive shift to the terminal R causes the opposite action. With the trigger On, the plate of the left-hand triode 50, along with its output terminal, is at a low potential, while the plate terminal of the right-hand triode is at a relatively high positive voltage. With the shift of potential between the output terminals, associated circuits are accordingly controlled.

A heated cathode type gas tube unit or thyratron GT, Fig. 1c, generally comprises a plate connected to a positive voltage supply at the upper terminal and a cathode connected to ground at the lower terminal. This gas filled tube includes a pair of grid input terminals 63 and 64, respectively. Under normal operating conditions, the grid 64 is biased negative and the tube is cut off or nonconducting. If both grids are biased positive, the tube fires and conducts for reasons to be hereinafter explained and continues to conduct in the standard manner until such time as the positive voltage supply is interrupted.

*General description*

Referring now to the drawings for one embodiment of the improved control means as applied to a serial-parallel type printer, there is diagrammatically shown in Fig. 1a a wire printer 10 which comprises a plurality of reciprocatable horizontally spaced print heads or mechanisms 11, only two of which are shown, disposed to impress the desired characters along a predetermined line on a paper record or form 12. The paper form is associated with a form feeding means or carriage 13 which passes the form behind a ribbon 14, and a stationary platen 15 disposed in line with the print heads and ribbon provides the proper backing for the printing operation.

The plurality of simultaneously operable printing heads 11 are arranged in transversely spaced relationship, each includes a presettable wire matrix head which is moved toward and away from the record or form by a biased print actuating member 16 in each printing subcycle to affect printing strokes and laterally of the recording material by other means 17 between printing subcycle strokes to enable printing in successive character positions in successive subcycles. After a number of such subcycles the printing of a complete line may have been affected by the concurrent operation of each of the print heads. Included with this mechanism is a means 18, for suppressing movement of the print heads 11 during certain of the machine timed subcycles and other idling periods in which no printing is to take place. This may involve periods when the printer is operating but no data is being fed to the printer, or at times when the form 12 on the carriage 13 is being advanced by a skip operation requiring more time than is normally provided between successive print strokes from the last printing subcycle to the first normal printing subcycle of the next printing cycle.

Any suitable mechanism may be provided to selectively suppress the operation of a complete line of print heads. By way of example only, a print head suppression magnet 19 is shown associated with an armature 20 having a latch portion 21 which may be shifted into the path of movement of the print head hammer device 22. This device is operated by means of a spring biased crank arm 23 having a cam follower riding a constantly rotating print head drive cam 24 secured to a continuously rotating print head drive shaft 25 at a subcycle rate. Thus, if the print head suppression magnet 19 is energized, the print hammer mechanism 22 is prevented from operating and the print heads 11 do not undergo an impact stroke. When the magnet 19 is de-energized, the latch 20 is not moved to interfere with the operation of the print hammer mechanism 22 so that printing may be affected in the printing subcycles.

The plurality of print heads 11 includes a plurality of print wires 26 slidably mounted in flexible guide tubes 27. These guide tubes are moved toward the platen 15 so that the projecting ends of the preset print wires 26 strike the paper form 12 to impress the character pattern. A code rod 28 is provided for each print head and is mounted on a print plate 29. Rapid and accurate indexing of each code rod 28 to the various character determining positions is accomplished by a bank of wedges or the like 30. Each bank of wedges has a positive displacement so that only a minimum of movement is entailed in moving the code rod from one position to another by merely advancing and restarting different wedges under control of related setup means of magnets 48, Figs. 1a and 1d. Each bank of wedges consists of two units of three wedges each having values of 1, 2 and 4, respectively, when moved to an operating position.

The lower end of each code rod 28 has a flexible stem 60 with an enlarged gear 71 through which rotation and translation is imparted to the code rod to index the same in any of its various character determining positions. The vertical indexing of each code rod is affected by moving it downward from its normal position by a corresponding lever 72. Rotation of the code rod 28 to any of its desired positions is accomplished by a rack 73. Positioning of the wedges 30 is affected by energizing the corresponding magnets 48 identified as A, B, C, D, E and F, Fig. 1d, which cooperate with a common drive mechanism 74, Fig. 1a, connected to the wedge banks 30. There are six wedges on each bank, three being used for translating the code and three for rotating the same. The pulsing of any one or more of these magnets will result in the disposition of a corresponding code rod 28 in a character determining position. Suitable pawls 75 secured to the magnet armatures cooperate with a related slide bar 76 to affect operation of the wedges 30 which in turn acts to set up the code rod 28 in the standard manner. The slide bars are continuously reciprocated at a subcycle rate by means of a setup cam 77 secured to a setup shaft 78. Likewise, the code rod 28 is continuously reciprocated toward and from the lower ends of the print wires 26 at the subcycle rate by means of a code rod bail cam 79 secured to the code rod bail drive shaft 80.

In operation of the printer, when the impulse or impulses to the setup magnets A, B, C, D, E and F are delivered, the cam 77 for the slide bars 76 of each setup plate assembly begins to depress those slide bars to position the wedges 30 on the basis of the pawls 75 which were moved into the slide bar path by the released armature latch arms. Through the interconnections between the wedges 30 and the code rods 28, the latter will simultaneously be indexed to differential positions indicative of particular characters. The code rod housing bails now move the code rods 28 against the corresponding print wires 26 to impart differential settings thereto. Thus, as the code rod bail cam 79 becomes effective and moves the code rods fully against the print wires, the code rod bail cam almost immediately begins to recede so as to allow the print wires to move rearwardly during printing time. This printing time is effectuated by the cam 24.

In the meantime, the latch arms 75 are restored. The cam 77 begins its effectiveness before the time for the next pulses to the setup magnets. It can be seen that, while the code rod bail cam 79 is effective to transfer the information from the indexed code rods to the print wires 26, the setup magnets 48 are being conditioned with the information to be printed in the next subcycle and that as soon as the code rod bails have restored, the code rods 28 are indexed to new positions.

The characters or data to be printed on the forms 12 are delivered from a data source 81, such as, a punched card, magnetic tape or the like, Fig. 1c, and placed in a buffer storage medium 82, such as, a magnetic drum or core storage in any suitable manner. This data may be in coded form and involve one or more bits of information for each character. When required, certain characters in a line of data are delivered from the storage medium to a setup buffer readout transfer device 83, Fig. 1d, in a predetermined manner, dependent upon the type of printer operation, to actuate one or more of the setup magnets or the like 48 which are operative to position one or more wedges 30, Fig. 1a.

After setup of the character, the constantly rotating print head cam 24 operates through the crank arm 23 to drive the print heads 11 against the platen 15 and impress the characters on the form 12. At this time the constantly running print head lateral motion shifting cam 17 operating through a bell crank and strap mechanism 55, shifts the print heads 11 to the next character or impression receiving position.

As shown in Fig. 1a, a printer motor 85 continuously rotates the print head, bail and setup shaft 25, 80 and 78, respectively, through suitable gearing or the like 86 and also provides the basic subcycle control through a constantly rotating subcycle shaft 87. Extending from the motor output shaft is a printer clutch 88 of any suitable type which may rotate its output or driven control shaft 89 at a constant rate or be selectively disconnected and connected to the printer motor 85 in accordance with a control condition supplied from the carriage 13. The control shafts 87 and 89 are utilized, through the basic timing of the system, to aid in the synchronization of the printer 10 and carriage 13.

Since the particular detail elements of the printer 10 form no part of the invention, it is believed the above brief description is sufficient for an understanding of the invention. One form of wire printer to which the improved subcycle control is applicable is shown and described in the following applications:

The print head for impressing the desired character on the paper form may be of the type disclosed in Frank J. Furman et al. application, Serial No. 478,649, filed December 30, 1954. A suitable code rod for setting up the desired character is disclosed in Frank J. Furman et al., Patent No. 2,785,628, dated March 19, 1957. A means for actuating the print heads and suppressing the printing operation may be of the type disclosed in Frank J. Furman et al., Patent No. 2,829,592, dated April 8, 1958. The mechanism for setting up the desired character in a print wire is shown and described in Frank J. Furman application, Serial No. 479,106, filed December 31, 1954. A means for providing a readout of data to be printed in a preselected manner is disclosed in H. A. Jurgens et al. application, Serial No. 479,107, filed December 31, 1954. All of the above applications are assigned to the assignee of the present invention.

While the improved control means is shown applied to a serial-parallel wire type printer, other types of printers or the like could be utilized equally as well.

Since the invention is not directed to any particular type of carriage structure, any of the carriages disclosed in the following patents and applications would, with suitable modifications, be applicable: A. W. Mills et al. Patent 2,531,885, dated November 28, 1950; J. H. Bakelaar et al. Patent 2,684,746, dated July 27, 1954; F. J. Furman et al. Patent No. 2,842,246, dated July 8, 1958; and J. M. Cunningham et al. Patent No. 2,747,717 dated May 29, 1957. All of the above patents and applications are assigned to the assignee of the present invention.

In the particular embodiment shown, a carriage of the type described in the above Cunningham application is diagrammatically indicated. However, it is to be understood other suitable carriages could, with relatively minor changes, be made to perform the necessary steps or functions.

As shown in Fig. 1a, the carriage device 13, associated with the printing mechanism 10, may be of any basic design modified as will be hereinafter described. By way of example only, there is shown a 5 channel control tape or the like 91 for the carriage which is operated in synchronism with movement of the paper form. A carriage drive means or motor 92 continuously rotates a shaft 93 having a pair of pulleys 94 and 95, respectively, secured thereto. These pulleys each include a belt or the like 96, one of which is associated with a low speed clutch 97 and the other with a high speed clutch 98. The output or driven side of the clutches is secured to a driven or carriage shaft 99 and each clutch is adapted to be independently actuated to selectively rotate the carriage shaft 99 at a low speed or at a high speed, dependent upon predetermined conditions.

Associated with the carriage shaft 99 in any suitable manner and to rotate therewith are a pair of spaced tractor wheel elements 101 having projecting pins for advancing the paper record or form 12 past the platen 15 at any preselected rate. As shown, the projecting pins on the tractor enter equally spaced perforations in the form 12 so that any motion of the tractor imparts a similar motion to the form.

A line spacing or detent mechanism 102 and a brake 103 are associated with the carriage shaft 99 to hold the same stationary during the interval when printing is taking place. The line spacing mechanism 102 may include a ratchet wheel 104 and detent 105, the latter being operated under the control of a detent magnet 106. A brake magnet 107 may be provided for controlling operation of the brake 103 to grip and hold the shaft 99 stationary, while the detent 105 maintains proper alignment of the line on the form 12 with respect to the print heads 11. A control mechanism 110, Fig. 1c, is provided to operate the clutches and detent in a predetermined manner.

As shown in Figs. 1a and 4, the carriage shaft 99 for the paper advancing and aligning means is also adapted to drive a control tape 108 in synchronism with the form movement by means of a pulley 31 having projecting pins 32 meshing with perforations 33 in the endless tape 108. An adjustable idler pulley or guide 34 may be provided, which cooperates with the drive pulley 31 to support the tape in position with the proper tension. The control tape 108 may be of the multichannel endless belt type as described in the above-mentioned carriage control patents and applications. In order to simplify the description and aid in the understanding of the invention, the number of channels has been reduced to five. These may be defined as the heading, body, total, skip and overflow channels 111, 112, 113, 114 and 115, respectively, as shown in Fig. 6. Of course, any number of channels may be incorporated to accomplish the desired carriage and printer operation. In this instance the tape includes a control punch or perforation 109 so disposed as to provide the first heading, body and total line locations 116, 117 and 118, respectively, for the particular form 12 being printed as shown in Fig. 5.

Associated with the tape 108 for detecting the perforations in the channels when they lie within predetermined areas or zones A and B are a pair of light sensitive photoelectric devices or multiplier cells 120 and 121, respectively, which are spaced a suitable distance from the tape 108. Between each photocell 120 and 121 and the tape is a frustro-pyramidal light collecting guide or directing device 35 and 36, respectively, which may be formed from Lucite or other suitable light conducting material. These light guides are each provided with a lower enlarged light input area or surface 37 and a restricted upper light output surface 38 facing its related photocell. The lower surface of the guide 35 encompasses or defines the A zone or area and the like surface of the guide 36 encompasses or defines the B zone or area. As clearly shown in Figs. 4 and 7 to 10, below the tape 108 and extending longitudinally in line with each channel is an elongated U-shaped chamber 123 having an incandescent light source or the like 124 therein. The open end of each chamber 123 faces the lower surface 39 of the tape 108. Thus, if any one of the lights 124 in the chambers is energized, and the perforation 109 in the selected channel is within the area encompassed by the A and B zones, as shown in Figs. 8 and 9, the light will be conducted to one or the other of the photoelectric cells 120 or 121 by means of the related light guide 35 or 36, respectively. The output from these cells is directed and utilized by the carriage control means 110, Fig. 1c, in a manner to be hereinafter described.

The schematic wiring diagram discloses a control means, incorporating the photocell control, for operating the carriage 13 at low and high speeds and to provide the subcycle control for the printer 10. Since controls of this type are generally quite complex to accommodate for various operating conditions, the circuit has been simplified or idealized by eliminating certain portions thereof in the interest of clarity of presentation.

As shown in Fig. 1a, the rotating printer motor 85 continuously rotates the print head, bail and setup shafts 25, 80 and 78, respectively, along with the subcycle timing shaft 87 which is operative to continuously rotate the subcycle and printer clutch run cams 125 and 126, respectively, Fig. 1c, to make and break their respective cam contacts C125 and C126, respectively, once for each subcycle or printer operation. Likewise, each wire printer head must perform serial printing operations to complete the line of data.

The disclosed high speed carriage 13, Fig. 1a, utilizes two paper eject speeds, a high speed of 75 inches per second and a low speed of 25 inches per second. These speeds were attained by the operation of the magnetic friction clutches 97 or 98. When either clutch magnet is energized, its associated armature (not shown) is attracted and thus transmits the rotation of the magnet to the carriage shaft 99. The paper motion is stopped by energizing the friction brake 103 and the electrically operated detent 105 provides the positive stop and print line location.

If a skip is performed in high speed, it is necessary to decelerate to low speed before applying the brake and detent. This is accomplished by transferring control from the high speed clutch 98 to the low speed clutch 97, 1⅙ inches before the brake is applied, as shown in Fig. 11.

The slowdown and stop control are provided by the carriage control tape 108. In this instance, a printer clutch magnet 127, Fig. 1a, is energized at all timed subcycles by means of the cam contact C126, Fig. 1c, which attracts an armature 128, Fig. 1a, away from a projecting shoulder 129 to maintain the printer cam shaft 89 engaged and rotating with the subcycle shaft 87. The basic timing for the magnet 127 is shown in Fig. 3. At the end of any complete printing cycle, failure to operate the armature 128, Fig. 1a, causes disengagement of the printer control cam shaft 89 and further printer operation will be terminated in a manner to be hereinafter described.

This printer is intended for use with a variety of input media and is therefore stripped to its basic essentials as a unitized element. The auxiliary buffer storage device 83, Fig. 1d, provides the information sequentially to the print heads 11 as they progress across the paper. This buffer storage is normally not a part of the basic printer but would be of a design particular to the input system used with the printer.

The form feed or carriage should single, double and triple space and skip a maximum form length of 3½ inches without loss of a machine cycle or portion of a cycle. In this example, approximately 75 milliseconds is allowed for paper movement. A nominal safety factor of 10 milliseconds reduces the paper movement time to 65 milliseconds. By printing in four positions with each print head, each print head is set up and operated at a rate of 2,400 times per minute.

Fig. 12 shows how each machine or complete printing cycle could be subdivided into six subcycles, each of which is 25 milliseconds in duration. This cycle lasts 150 milliseconds, 75 milliseconds for paper movement in the carriage and 75 milliseconds to complete the four printing strokes. From the labeling of the chart, it can be seen the print heads 11 move from left to right and print in positions 1, 2, 3 and 4 on one cycle and then on the next cycle move from right to left and print in positions 4, 3, 2 and 1.

It is evident that if paper movement is not completed by the first print time in a machine cycle that the action of the print heads must be interrupted momentarily to allow for completion of paper movement. Such skips would be of 3½ inches or more. Each subsequent subcycle is tested to determine whether it is possible to start the print action. Loss of one subcycle for example will reduce the output from 400 to 342 lines per minute, loss of two will reduce it to 300 lines per minute, and so forth. From this it can be seen that interrupting the printer action in subcycle increments minimizes the time lost on long skips.

Fig. 3 explains the timing of the printing system including the setup pulse and the mechanical components in the setup and printing mechanisms. When the printing cycle is interrupted for paper movement, it is preferable to prevent the information from being set up in the print heads by holding up the pulses delivered to the setup magnets 48, Fig. 1d. In the disclosed setup mechanism, the carriage control system holds up the printing action in the case of a long skip before the pulses are delivered to the setup magnets.

Some of the basic functions of which the carriage must be capable are listed below. The selection of these functions or the successive operation of a series of functions result from a specific signal or series of signals which have their origin in the machine with which the printer and carriage are used.

(1) *Spacing*—Single line space for normal operation. Double or triple spacing under plugboard control. The time required for single, double or triple spacing is well within the 65 millisecond normal paper movement time.

(2) *Skip*—Start from any point on a form and stop under tape control.

(3) *Overflow*—Tape controlled signal from the carriage to indicate the last printing line of a form.

(4) *Print Control*—A carriage controlled signal to cause the printer to suspend operation for any number of subcycles, as required for skips greater than 3½ inches.

The carriage control is used to operate comparatively slow acting circuit elements which determine the stopping conditions of the carriage. The carriage operation is initiated by a single start pulse. This start pulse is sufficiently delayed in the machine cycle to allow selector control of the stopping conditions. The mechanism of the printer is such that the signal which starts the operation of the printer is received when the paper is 3½ inches from its stopping point. Thus, each tape channel must be provided with a means of storing the fact that the hole in the channel has passed the point 3½ inches from the stopping point even though only one channel is considered during a particular machine cycle.

Figs. 1c, 4 and 7 to 10 disclose the improved method of generating the desired control signals from the punched tape 108 by the use of the photomultiplier or electric tubes 120 and 121. An individual source of light 124 is provided for each channel. Since allowable time for operation is sufficient, the use of the incandescent lamps 124 is permissible. The light is collected in the two optical light gathering units or guides 35 and 36, respectively. The light guide 35 defining the A zone, monitors an area or zone of the tape, the length of which extends from 1⅓ to 3½ inches from the stopping point. The other light guide 36, defining the B zone covers an area of the tape extending from ⅙ to 1⅙ inches from the stopping point. The width of the areas 37 in each case is sufficient to cover the desired number of channels. The optical system described provides a means of eliminating the need for independent information storage means for each channel.

A brush 131, Figs. 1a and 4, is provided for the overflow indication in the overflow channel 115.

The magnetic drum storage unit 82, Fig. 1c, and the required switching circuits provide the stored information to the printer in the proper timed sequence. It is not necessary that the drum be mechanically synchronized to the printer. The digit or column information on the storage drum or medium 82 is associated with a timing ring system 132, Fig. 1d, which receives its basic timing pulses from a timing track 133 on the drum. After every print cycle, during paper transport time, the ring system is reset to a home position. A marker pulse which locates column one of the storage track is received from the drum before the rings again start operation.

In this manner column one of the stored information is associated with position one of the timing ring system 132 and each successive stored digit is located by a specific timing ring position.

As shown in Fig. 3, the drum must make at least one complete revolution during the time each setup emitter pulse supplied by the cam contacts C134, C135, C136 and C137 is present. This is associated with each print position. During the emitter pulse time, every fourth digit is read out to the printer as described in the above-mentioned application Serial No. 479,107. At the end of the fourth emitter pulse, all the information stored in the drum has been printed. The control cam contacts C134, C135, C136 and C137, Fig. 1c, mechanically operated by the clutched control shaft 89, provide the necessary synchronization between the electronic circuit action and the printing mechanism.

The information is stored on the drum 82, Fig. 1c, serial by bit, serial by column per track. A timing ring 138, Fig. 1d, provides the necessary pulses to the print unit gas tubes 140 to effect the serial to parallel conversion. The ring 138 supplies pulses to the print gas tube screen grids 63. The resulting action is that of a serial to parallel converter. Each excursion of the ring 138 conducts over a line 150 and causes the ring 139, Fig. 1c, to step one position. Thus the ring 139 transfers for each digit and may be selectively plugged to 120 relay points 141, which represent 120 columns of printing. The emitter cam contacts C134 to C137 select which of each group of four related relay points are closed. The selected relay points determine which of four digits is read into the print unit by providing the necessary print gate pulse. Fig. 3 shows the timing relationships between the switching circuit and the printer action.

Since a particular print mechanism and print head can accommodate only one character at a time or sub-cycle, or any of four characters in any of four subcycles, the subcycle select cam controls C134 to C137, Fig. 1c, are provided to permit the read out of only one of the four possible digits to each print mechanism in a subcycle. The subcycle select control, however, automatically advances in orderly sequence so that in successive subcycles the other of the four digits will be printed.

With thirty print mechanisms in a printer, there are thirty sets of six magnets each, Fig. 1d. The energization of each of these magnets 48 is controlled through the firing of the related two-grid controlled gas tube 140. Thus there are thirty sets or banks of six gas tubes each, one bank for each print mechanism and print head 11.

The printer is operated on a combinational code having six bits X, 1, 2, 4, 8 and 0. The reading out of the information from the magnetic drum is controlled by the printer. At a fixed time in each subcycle, a cam contact C142, Fig. 1c, is operated to close a storage gate 143 in the circuit with the read head for the information track. The closing of this gate connects the read head with a coincidence diode switch 144 having an output line 148 leading to a bit distributor 149, Fig. 1d, which hence receives the information serially by bit and digit. The closed bit ring 138, advanced by the reading of the permanent spots on the synchronizing drum track, is continually operative to transmit pulses in proper time sequence with the reading of the bit spaces on the information drum track. It transmits separate pulses over separate lines to seven coincidence circuits in the bit distributor. Coincidence between any of these seven bit ring fed pulses and an information bit results in a conditioning of the related gas tube 140 in each print mechanism bank. Only one of the thirty possible gas tubes may be fired at this time, however, and this is the one whose other grid is currently being biased.

A gas tube fires when both grids are conditioned. Since the bit pulses emanating from the bit distributor 149 are momentary and control pulses emanating from an exit hub are only slightly longer involving, namely, the time necessary for the seven individual bit pulses of a digit, provision is made to hold the gas tubes through heater resistors by closing cam contact C146. Thus, the conditioned gas tubes 140 remain conductive while the read out of the rest of the information is accomplished.

After a time sufficient to transfer all of the information to the gas tubes, magnet cam contact C144 closes to connect the thyratrons with the magnets 48 of the respective print mechanisms. This results in the pulsing of those print magnets whose corresponding thyratrons have been rendered conductive and constitutes the print magnet pulse time. The pulse time is terminated by the opening of printer controlled cam contacts C145 and C146 in the plate circuits for the thyratrons, resulting in the latter's extinction.

The information which has been transferred to the sets of print magnets is then transferred to the corresponding code rods for the corresponding print mechanisms.

In the meantime, printer control cam contact C135, Fig. 1c, has operated to advance the subcycle select control. This operatively connects the second of each set of four printer input hubs with one of the grids of the corresponding bank of gas tubes 140, Fig. 1d, so as to enable their setting up the characters which are to be printed in the print positions adjacent those just being printed. Thereafter, the cam contact C142, Fig. 1c, controlling the readout gate 143 again closes to permit the transfer of information to condition the print mechanisms anew.

The process described above for the first and second subcycles would be followed to effect the third and fourth subcycles. By this time a complete line of printing is completed to finish the particular print cycle.

In the next or second cycle and in alternate future or even numbered cycles, the print heads are shifted laterally from right to left to print the information in the reverse order that they did in the first cycle. The inversion of readout may include the printer controlled cam contacts C134 to C137, Fig. 1c. At the end of the four subcycles, that is, the second cycle, the control will again reverse the subcycle select control so that they then operate in the first-described order.

*Operation*

Assuming the carriage 13, Fig. 1a, is at rest with the desired heading line 116, Fig. 5, in position adjacent the platen 14 ready for the first subcycle printing operation, the detent 102 on the carriage will be engaged to insure proper spacing and the brake 103 is applied to hold the paper form 12 stationary. As the carriage was approaching the above stop location, the first print position cam contact C134, Fig. 1c, closed to operate its related relay R134 and transfer the associated contacts for directing the selected data to the various print heads for that particular print position.

During this interval, the storage gate cam contact C142 closes to feed a positive value to the storage gate diode switch 143, which gates the entire line of data to be printed to the print head diode switch 144. The timing rings 139 and 138, Figs. 1c and 1d, operated from the timing track 133, cooperate with the line of data delivered to the print head diode switch 144, Fig. 1c, to gate the proper pulses which arrive serial by bit and digit to the storage gas tubes 140, Fig. 1d. In this example, these thyratrons are coded to represent certain values and work in combination to provide the proper code rod movement.

When the storage gate cam contact C142, Fig. 1c, closes for the first print subcycle, the gas tube plate cam contact C145, Fig. 1d, also closed to condition all of the gas tube plates. Wherever coincidence occurs at the control and shield grids 63 and 64, respectively, of any of the gas tubes 140, that tube fires and continues to conduct after the control pulses are removed in the standard manner. In each group of six gas tubes, one or more of the same may remain conducting.

Each of the tubes 140 is associated with an independent setup magnet 48 which, when energized, is directly operative to contribute to the shifting of the analyzer mechanism or wedges 30, Fig. 1a, as set forth in the above-mentioned application, Serial No. 479,107. Operation of the magnet pulse cam contact C146, Fig. 1d, occurs after read-in of data to the gas tubes and any of the conducting gas tubes completes the circuit for the related magnet. After setup of the code rod 28, Fig. 1a, by operation of the magnets 48, the bail cam 79 shifts the code rod laterally and generates the desired character at each print head. Next, the print heads are simultaneously driven against the form 12 and one fourth of the line has been printed.

As the code rod 28 is returned to normal, the data for the next print head positions is being set up in the storage gas tubes 140 as previously described. In the example, the operation of the storage gate cam contact C142, Fig. 1c, and other basic timing occurs every 25 milliseconds. Thus, the various mechanisms operating at a subcycle rate must complete their respective functions and be ready to repeat within the time allotted in the proper timed relation.

After the print heads 11 are driven against the paper form 12, they are retracted. As retraction occurs, the rotating cam 17, Fig. 1a, simultaneously shifts the print heads to the next character receiving position. By this time the code rod is laterally shifted to set up the wires for the second subcycle printing operation.

This same setup operation and lateral shifting of the print heads 11 is repeated for the third and fourth printing subcycles. All during this interval, the carriage 13 is held stationary.

As the fourth printing subcycle is completed, a carriage start pulse is generated by closing of the print carriage start cam contact C151, Fig. 1b. This provides a positive value over a line 152 to low speed, high speed and low speed skip diode switches 153, 154 and 155, respectively. Since the C pulse line 156 is open at this time, an inverter 157 provides a positive output to the low speed diode switch 153. This switch provides a positive value through the low speed diode mix 158 and related conductor 160 leading to the terminal S to turn On or set the low speed trigger T1, Fig. 1c. Turning On of the low speed trigger T1 raises the related output line 159 leading to the low speed power tube PW1 to cause the same to conduct. At the same time this positive value is directed through the diode mix 161 and applied to the terminal R of the detent trigger T3 to reset or turn the same to its Off position. Turning Off of the trigger T3 drops the related output line 162 and cuts off the power tube PW3, which in turn reacts through the detent and brake relays R163 and R164 to open the related contacts R163a and R164a to de-energize the detent and brake magnets 106 and 107, respectively, Fig. 1a, over the conductors 165 and 166, respectively. De-energization of the detent and brake magnets releases the carriage shaft 99 and energization of the low speed clutch relay R167, Fig. 1c, by conduction of the tube PW1, closes contact R167a to energize the low speed clutch 97, Fig. 1a, over a conductor 168, in any suitable manner.

Energization of the low speed clutch 97 immediately causes rotation of the carriage shaft 99. As the carriage shaft begins to rotate, the form to be printed is advanced and one of the line space segments 169 on a commutator 171, secured to the shaft 99, passes under a brush 172 to complete a circuit over a conductor 170 to a suitable pulse shaper 173, Fig. 1b. This pulse shaper merely provides a positive going value to a detent diode switch 174. At the same time, a line space output device or counter 175 applies a positive value to a line space diode switch 176 which has one side thereof connected to the C pulse line 156 through an inverter 177. The output from the switch 176 conducts through a diode mix 178 and provides coincidence at the brake diode switch 174. A positive output from this latter switch 174 is applied over a conductor 180 to the trigger T3, Fig. 1c, to set or turn the same On.

As trigger T3 turns On, the positive output over the line 162 to the power tube PW3 causes the same to conduct and this energizes the detent and brake relays R163 and R164 to close their related contacts. This positive value on the line 162 is also directed through a diode mix 179 to the low speed trigger T1 to reset the same to its Off position. As trigger T1 turns Off, the output over the line 159 drops to cut off power tube PW1 and de-energize the low speed clutch relay R165. Deenergization of the low speed relay R165 operates to disconnect the carriage shaft 99 from the carriage drive motor 92, Fig. 1a, and energization of the brake and detent relays R164 and R163, respectively, Fig. 1c, operates to energize the magnets 107 and 106, respectively, Fig. 1a, to lock the carriage shaft 99 and hold the form 12 stationary at the first line after its starting point for the next printing cycle, which, of course, includes the proper number of printing subcycles.

Since double and triple line spacing functionally operate in the same manner, no description or circuitry is deemed necessary for an understanding of the invention.

Also if desired, a manual space key or switch 181,

Fig. 1b, may be provided to manually line space or eject the form 12 by applying a positive value or pulse to the diode switch 153, over the line 152. During regular line spacing operations, the tape control 91, Fig. 1a, performs no function.

The channel lights 124 associated with each channel 123 on the control tape 108 are under the direct control of a channel selector mechanism, indicated generally by the box 182, Fig. 1b. Since the type of channel selector and its controlling function forms no part of the invention, a detail description is not deemed necessary. A mechanism of this type is disclosed and claimed in the above-mentioned Mills et al. Patent 2,531,885. As shown, a plurality of manually operable switches 183 have been provided to make the various channel selections, if desired.

The channel selector 182 operates in association with the tape control unit 91, Fig. 1a, and is operative under the control of the master and detail records or other material to position the form 12 in the proper location for the next printing operation. For example, assuming the data to be supplied to the printer involves that normally required for the printing of the heading, the signal for advancing the next form to the first line 116, Fig. 5, on the heading may occur some time during the printing of the last line of the previous form. Thus a pulse is delivered over a line 184, Fig. 1b, to the heading pick coil portion of the heading relay R185 which closes all of the related contacts. Operations of this relay close the hold contact R185a to hold the heading relay transferred. Transfer of the channel light contact R185b completes a circuit over the conductor 186 to the related heading channel light 124, Fig. 1a, and energizes or illuminates the same. At the same time, the overflow contact R185d, Fig. 1b, transfers to open the overflow circuit and contact R185c closes the C pulse line 156 to raise the same.

Raising of the C pulse line 156 acts on the inverters 157 and 177 to drop one side of the related diode switches 153 and 176, respectively. At the same time, one diode each of the high speed clutch, B zone and print suppression diode switches 154, 187, Fig. 1b, and 188, Fig. 1c, respectively, are conditioned. As the heading channel light ignites the operation of the carriage 12 will be directly dependent upon the location of the control perforation 109 in the heading channel 111, Fig. 6.

For the purpose of this description, it will be assumed the first line of the heading 116 is located somewhere within 1⅙ inches of the desired printing position when the heading channel 111 was selected and the carriage start cam contact C151, Fig. 1b, closed at the end of the last subcycle printing operation.

Operation of the heading channel relay R185 occurs as described above and the diode switches associated with the C pulse line 156 are driven up or down, as the case may be. As soon as the heading channel light 124 ignites, the perforation 109 in the tape permits a portion of the light to pass therethrough, as shown in Fig. 8. The light striking the exposed area 37 of the light guide 36 defining the B zone is directed upward to the photoelectric cell 121, which responds and sends an electrical signal over a conductor 190 to a related pulse shaper or the like 189, Fig. 1c. This device includes an output or B line conductor 191 leading to various diode switches and mixes.

As the positive value leaving the shaper 189 passes through a print suppression diode mix 192, it operates an inverter 193 whose output 194 goes negative and drops one element of the print suppression diode switch 188. Dropping of the line 194 indicates that the carriage 13 will have sufficient time to advance the form the desired distance by the time the next scheduled printing subcycle takes place. Therefore, the printing mechanism continues in operation for code rod setup and the like at its regular rate. At the same time, the positive value applied to the B line 191 feeds to two inverters 195 and 196, Fig. 1b. The first inverter 195 is effective to drop one side of the high speed clutch diode switch 154. This indicates the carriage will have sufficient time to advance the form to its proper position at the low speed rate. The second inverter 196 drops a skip brake diode switch 197 which is also connected to an output line 198 of a trigger T4.

Since the C pulse line 156 is positive, the line space diode switch 176 is held open by the related inverter 177. Thus, the detent diode switch 174 is held open regardless of the number of line space pulses supplied thereto over the line 199. The B pulse line 191 is connected to the diode switch 187 which also connects with the C pulse line 156. The coincidence positive values now at this switch 187 provides an output over a conductor 201 to the low speed skip diode switch 155 and at the same time sets the trigger T4 to raise one side of the skip brake diode switch 197 by means of the conductor 198. Diode switch 155 is also connected to the carriage start line 152 and coincidence at this point provides an output through the diode mix 158 to set the low speed clutch trigger T1, Fig. 1c. Setting of the low speed clutch trigger T1 operates the low speed clutch relay R165 to energize the slow speed clutch 97, Fig. 1a, as previously described. Flipping of the trigger T1, Fig. 1c, also provides the positive value through the diode mix 161 to the detent trigger T3 to reset the same, which action releases the detent and brake 106 and 107, respectively, Fig. 1a, to permit carriage movement at low speed. During this advance of the form, the line space commutator pulses delivered by brush contact with the commutator segments 169 are blocked at the diode switch 174, Fig. 1b, and the line space pulses are blocked at the line space diode switch 176 by the condition of the inverter 177.

As the form 12 and tape 108, Fig. 1a, continuously advance at low speed, the control perforation 109 in the heading channel 111 is continuously scanned until it leaves the B zone. The heading channel light 124, while still illuminated, is cut off from the B zone light guide 36, as shown in Fig. 10. This immediately drops the output of the B line 191 and the output of the inverter 196, Fig. 1b, is driven positive. The other input element of the diode switch 197 is held positive by the line 198 extending from the trigger T4, now in its set position. Coincidence at the diode switch 197 provides an output extending through the diode mix 178 to the detent diode switch 174. As the next commutator pulse arrives over the line 199, coincidence at the diode switch 174 provides an output over the line 180 to set the detent trigger T3, Fig. 1c. Operation of the detent trigger T3 drives its output line 162 positive leading to the power tube PW3 to reapply the detent and brake 102 and 103, respectively, and continues through the diode mix 179 to reset the trigger T1, which in turn de-energizes the low speed clutch 97 by cutting off its related power tube PW1. Setting the trigger T3 drops a line 202 extending to an inverter 203 to provide a positive value over the line 204 to reset the trigger T4, Fig. 1b. Resetting trigger T4 drops line 198 to open diode switch 197. At some portion of the printing cycle, the channel selector hold cam contact C205 opens and drops the heading relay R185 to extinguish the heading channel light 124, Fig. 1a, by returning all of the related relay contacts to normal.

The first heading line 116 on the form is now in position to receive the first subcycle printing operation, which is timed to take place in the previously described manner with no delay. Line spacing then continues after each group of printing subcycles upon every operation of the carriage start cam contact C151, Fig. 1b, in the standard single, double or triple space manner.

When one of the next control cards or the like is detected by the data feeding device of the printer, this indicates that the last line in the heading is being printed.

A control signal is directed from the channel selector 182 to instruct the carriage to move to the first line 117 of the body in the form.

As the body selection is made over the conductor 206, this action energizes the body relay R207 to close the related contacts in the same manner as the heading relay R185. Except, in this instance, the transferred relay contact R207b energizes its related body channel light 124, Fig. 1a, over the conductor 208. For the purpose of this explanation, it will be assumed the first line 117, Fig. 5, of the body on the form 12 happens to lie somewhere between 1⅓ and 3½ inches from the desired printing position, when the selection is made, as shown in Fig. 9. Thus, the related control perforation 109 in the body channel 112, Fig. 6, will lie somewhere in the A zone covered by the exposed surface 37 of the related light guide 35 thereabove leading to the A zone photoelectric cell 120, Figs. 1a, 4 and 9. The B zone area covered by the photoelectric cell 121 remains nonresponsive.

Operation of the body channel selection also closes contact R207c, Fig. 1b, to condition the C pulse line 156 in the previously-described manner. The light passing through the heading control perforation 109 is directed by the light guide 35, Fig. 1a, to the photoelectric cell 120 which in turn provides a signal over a conductor 200 to the related shaper 189, Fig. 1c. The output from this shaper extends over a line 209, through the diode mix 192 and related inverter 193 to hold the print suppression diode switch 188 down. This action, like that previously described for the photocell 121 in the B zone, indicates to the printer suppress control mechanism 211 that the carriage will be capable of advancing the form to the first body line 117 in time to receive the first subcycle printing operation without requiring printer delay. Accordingly, the code rod setup mechanism continues to operate at its regular timed rate. However, the carriage 13 must operate at high speed for at least a portion of the allotted time to accomplish the desired form movement.

Due to the absence of the control perforation in the B zone, Fig. 1a, the line 190 and the B line 191 remain down and this condition acts on the inverter 195, Fig. 1b, to condition one portion of the high speed clutch diode switch 154. Closing of the C pulse contact R207c conditions another portion of the high speed diode switch 154 by means of the C pulse line 156 and as the carriage start pulse arrives over the line 152, upon closing of the carriage cam contact C151, the output from this switch sets the trigger T2, Fig. 1c. Flipping of the trigger T2 drives its output line 212 positive causing the related power tube PW2 to conduct, which in turn energizes the high speed clutch relay R213. Transfer of this relay closes contact R213a to energize or actuate the high speed clutch 98, Fig. 1a, over the conductor 214. The positive output from the trigger T2, Fig. 1c, is applied through the diode mix 161 to the detent trigger T3 to reset the same. This cuts off the power tube PW3 to release the detent and brake 102 and 103, respectively.

Under these conditions, the carriage immediately begins to accelerate to high speed, advancing the form 12 and control tape 108 in synchronism therewith. Since the line space diode switch 176, Fig. 1b, is held down by the related inverter 177 in the line 156 and the trigger T4 has been reset, the commutator and line space pulses are blocked, at their respective diode switches 174 and 176.

With the form and control tape advancing at high speed, the control perforation 109 in the body channel 112 will, within some time interval, pass out of the A zone, Fig. 9, and into the B zone, Fig. 8. As this transition occurs, the output from the A zone photocell 120 drops and the B zone cell 121 responds by raising the B line 191, Fig. 1c.

Raising of the line 191 now causes an operation as previously described, in that coincidence occurs at the B zone diode switch 187, Fig. 1b, which sets the trigger T4 to raise its output line 198 and at the same time the output from the switch 187 acts to provide a positive value at the speed transfer diode switch 215. This switch was previously conditioned by the positive output supplied over the output line 212 of the trigger T2, Fig. 1c. The output from the speed transfer diode switch 215 leads through the diode mix 158 and acts to set the low speed trigger T1, Fig. 1c.

Operation of the low speed trigger T1 raises its output line 159 to the power tube PW1 which in turn energizes the low speed relay R165 and connects the low speed clutch 97 to the carriage drive motor 92, Fig. 1a. This positive value on the line 159 also drives through a connecting diode mix 216, Fig. 1c, to reset the high speed trigger T2 which, of course, drops the related output line 212 leading to the power tube PW2 and de-energizes the high speed clutch 98 by dropping out the high speed clutch relay R213. The same action opens the speed transfer diode switch 215, Fig. 1b.

The carriage now continues at the low speed rate, however, the low speed connection acts to decelerate the carriage to its low speed value. The timing and spacing is such to reduce the speed to its proper value by the time the control perforation 109 passes from the B zone, as shown in Fig. 10, thereby generating a stop signal for the carriage through the detent diode switch 174, Fig. 1b, on the next arriving commutator pulse, as previously described for the low speed skip.

From the above it can be seen that if any control perforation in any of the selected channels is within the A or B zones when a selection is made, the carriage 13 will be selectively advanced at either low speed or high speed without interrupting the normal setup or printer operation.

For the purpose of this description, it will now be assumed several lines have been printed in the body portion of the form 12 in the described line space manner and that it is now desired to advance the form to print a total at the lower section 118 thereof, Fig. 5. The total channel selector relay R217 operates to shift its related contacts in a manner identical to both the heading and body selection relays R185 and R207, respectively. The C pulse line 156 is raised by the transferred contact R217c in the usual manner and the total channel light 124 is ignited by closing the contact R217b in the conductor 218. It will also be assumed that the control perforation 109 for the total channel 113, Fig. 6, happens to be somewhere to the right or out of range of the A zone and, of course, the B zone, as shown in Fig. 7. While the total channel light 124 ignites, no perforation is available to permit this light to pass through the light guides 35 or 36 to either of the photoelectric cells 120 or 121. Thus, the output from both tubes remains down and the output of the related inverter 193, Fig. 1c, leading to the print suppression diode switch 188 remains positive. Since the B line 191 remains down, the high speed clutch trigger T2 is set upon the application of the carriage start pulse over the line 152 in the exact manner as described for the high speed operation and the form is accelerated to high speed.

During this interval, the C pulse line 156 also conditions the print suppression diode switch 188, Fig. 1c, and as the constantly rotating subcycle shaft 87, carrying the subcycle cam 125 closes its cam contact C125, coincidence at the switch 188 directs an output to the print suppression power tube PW4 to cause the same to conduct and energize the print suppression relay R221. Transfer of this relay closes a contact R221a in a conductor 222 to energize the print head suppression magnet 19, Fig. 1a, to prevent actuation of the print heads 11 by latching the print head hammer mechanisms. At the same time, a related contact R221b, Fig. 1c, connected in series with the clutch run pulse cam contact C126 opens. This prevents the energization of the print clutch magnet 127, Fig. 1a, over the line 223 when the latter cam contact C126 closes.

De-energization of the print head magnet 127 at the normal clutch run pulse time indicates that the required form 12 movement will consume more time than the maximum allotted for the subcycle setup of the printer. Therefore, operation of the printer setup must be terminated until such time as the total line 118, Fig. 5, of the form reaches some predetermined position. While the print head, bail, setup and subcycle shafts 25, 80, 78 and 87, respectively, Fig. 1a, are continuously rotated, operation of the remaining controls is terminated as soon as the print clutch armature 128 engages the abutment 129 to stop rotation of the control shaft 89. That is, operation of the setup magnets 48, thyratrons 140 and storage gates 143 for feeding data to the buffer storage device 83, Fig. 1d, is held in abeyance.

Under the above conditions, the carriage is not affected and continues to advance the form 12 and control tape 108 at high speed, Fig. 1a. As the control perforation 109 in the total channel 113 passes into the A zone, Fig. 9, the related light guide 35 immediately reflects this information to the photocell 120 which conducts over line 200 to apply a positive output over the A line 209, Fig. 1c, through the diode mix 192 to the related inverter 193 to open the print suppression diode switch 188. This cuts off the power tube PW4 and permits the print suppression relay R221 to return to normal. While the total line 118 on the form still has 3½ inches to travel before it reaches its printing position, the printer can again begin initiating the first subcycle printing setup operation. With the print suppression relay R221 returned to normal, contact R211a opens to release the print heads and contact R211b closes so that as the clutch run cam 126 closes its contact C126, which is timed for the beginning of each subcycle of operation, the magnet 127, Fig. 1a, is energized to shift the armature 128 and permit re-engagement of the printer clutch 88. Re-engagement of the print clutch 88 initiates rotation of the control shaft 89 and all of the related control cams. The related cam contacts are closed in a preselected order to provide the proper readout and setup. While one or more timed subcycles were lost in this operation, re-engagement of the control clutch initiates a complete printing cycle. When the control perforation in the total channel 113 passes to the B zone, Fig. 8, the carriage is decelerated and stopped just prior to the printing operation, as in the manner previously described.

From the above it can be seen that whenever a skip operation is called for requiring a period of time greater than normally allotted for form movement, only that portion of the following printing cycle is consumed which is required for form movement. This represents a considerable saving in time.

While the various conditions have been set forth, applied to heading, body or total channels, it is to be understood that a short skip, long skip or printer suppress operation would be applicable to any of the channels.

The skip or eject channel 114, Fig. 6, under the control of the skip channel relay R224, Fig. 1b, may be included for conditions when the selector or printer desires to eject or advance forms or the like without printing. In this instance, the contact R224b energizes the related skip channel light 124, Fig. 1a, over the conductor 225.

From the above, it can be seen a skip operation removes the stop control of the carriage from the commutator 171, Fig. 1a, for a period during paper motion and transfers control to a selected tape channel. As the tape approaches the stopping point, control is restored to the commutator 171. Channel selection is accomplished by relay selection, which in turn energizes the appropriate channel illumination source. The selection circuit is arbitrarily arranged for higher order channels to take precedence if two or more channels are selected simultaneously.

The skip operations under control of the photoelectric cells may be divided into three classifications and each is treated separately as described above.

(1) Short skip—skip a distance of 1⅙ inches or less.
(2) Long skip—skip a distance of from 1⅓ to 3½ inches.
(3) Long skip with lost printer subcycles—skip a distance greater than 3½ inches.

Machine latchup—If a skip cannot be completed in 65 milliseconds or less, the carriage controls must indicate this before skipping starts. This information comes from the control tape operating in synchronism with the form.

Machine unlatching—If the machine is latched up for a skip requiring more than 65 milliseconds, then the carriage must provide an unlatching signal at machine clutch time when it determines that the paper will be stopped at the corresponding print time.

If all skips can be completed within 65 milliseconds, then the machine latchup signal can come from a tape channel sensing device indicating whether the skip is larger or smaller than a fixed limit.

The printer clutch 88, Fig. 1a, is actuated at a fixed point in each machine subcycle. In this embodiment, the carriage signal which gates the clutch actuating pulse appears approximately 15 milliseconds before clutch time. In addition, there is a 40 millisecond interval between clutch time and print time. Thus, the tape sensing device should provide the gating signal considerably before the paper stop signal is available. After the tape hole passes the control sensing point, the paper will stop in 5–10 milliseconds less than the normal skipping time, which is assumed to be 65 milliseconds.

To summarize: Channel selection may be provided electronically. However, where sufficient time is allowable, the use of the described relay switching is permissible.

When a tape channel is selected, the location of the control perforation 109 in that channel shall determine the carriage speed. If, before motion begins, the control perforation lies within the B zone, the carriage will start in low speed. If the perforation does not lie within the B zone, the carriage will start in high speed but switch to low speed as the control perforation passes into the B zone. When the control perforation passes from the B zone, the brake and detent will be applied so that the form will stop with the following print line accurately located. If, before paper motion begins, the control perforation in the selected tape channel lies within the A zone, then the printer, and so forth, will continue to operate. However, if the control perforation lies outside the A and B zones, the printer shall be latched up.

The printer may be released or unlatched at the clutch time in any following subcycle after the control perforation has moved into the A zone.

The overflow channel 115 associated with the control tape permits advancing of the form 12 under certain predescribed conditions. Since the means for providing an overflow to the body of a second or following form forms no part of the present invention, no description of the overflow control means at the lower left-hand portion of Fig. 1b is deemed necessary. It appears sufficient to state that operation of this control means causes the carriage to automatically skip as previously described.

Fig. 11 is a graph showing the maximum high and low speed skip distances without a subcycle printer delay.

From the above description, it can be seen that an improved control means has been provided for a printer having a form feeding carriage with a channeled control tape which eliminates the necessity of elaborate information storage facilities for each channel. This is accomplished by providing light guide devices which continuously scan and monitor all channels while the control indicium is in the selected carriage and printer control zones. In addition, an improved tape controlled carriage has been provided which reduces wear of the control tape under operating conditions.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a light sensitive control, the combination of a movable member, drive means for operating said movable member at a plurality of speeds, means for initiating movement of said movable member, a control tape having a light conducting indicium therein operated in synchronism with said movable member, a light source associated with said control tape to project light through the indicium, means for energizing said light source, a plurality of light sensitive members responsive to a light indication to selectively provide output signals, a light guide for each tube disposed between said tape and a related light sensitive member, said light guides each having an enlarged light collecting area disposed to continuously monitor the adjacent portion of said control tape for the presence of the light conducting indicium therein and to conduct light to its related light sensitive member, means responsive to the output of one of said light sensitive members to advance the movable member at one speed upon the appearance of the light conducting indicium, and means responsive to the output of another of said light sensitive members to advance the movable member at a second speed upon the appearance of the light conducting indicium at the second light collecting area.

2. The combination as claimed in claim 1 including means responsive to the disappearance of the light conducting indicium from said light collecting areas for stopping said movable member.

3. In a light sensitive control, the combination of a movable member, drive means for operating said movable member at a plurality of speeds, means for initiating movement of said movable member, a multichannel control tape having light conducting indicium in at least some of said channels operated in synchronism with said movable member, a separate light source for each of the channels, means for selectively energizing one of said light sources to interrogate the related channel, a plurality of light sensitive members responsive to a light indication to selectively provide output signals, a light guide for each light sensitive member, said light guides each having a light collecting area disposed adjacent a portion of said control tape to cover a plurality of the channels and continuously monitor the same for the presence of the light conducting indicium in the selected channel and to conduct the light projecting therethrough to its related light sensitive member, means responsive to the output of one of said light sensitive members to advance said movable member through said drive means at a first speed upon the appearance of the light conducting indicium at the related light collecting area, and means responsive to the output of the next light sensitive member upon continued movement of said control tape and the appearance of the light conducting indicium at the next light collecting area for advancing the movable member at a second speed.

4. The combination as claimed in claim 3 including means responsive to the disappearance of the light conducting indicium in the selected channel from the area encompassed by the last light guide for stopping said movable member.

5. In a light sensitive control for a printer having a form feeding carriage, the combination of a multispeed carriage for feeding forms to be printed at line space and eject speeds, means for initiating movement of said carriage, a multichannel control tape having light conducting indicium in each of the channels operated in synchronism with said carriage and form, an independent light source for each channel, means for selectively energizing one of said light sources to interrogate the selected channel, a plurality of photoelectric cells responsive to a light indication to provide output signals, a light guide for each photoelectric cell disposed between the same and said control tape, said light guides each having an enlarged light collecting area disposed adjacent a portion of said control tape to continuously monitor a plurality of the channels for the presence of the light conducting indicium in the selected channel and to conduct the light to its related photoelectric cell, means responsive to the appearance of the light conducting indicium at the one light collecting area and the output of the related photoelectric cells to advance said carriage through said drive means at the eject speed, means responsive to the continued movement and the appearance of the light conducting indicium at the light collecting area of the next light guide and the resultant output of the next photoelectric cell for advancing said carriage at line space speed, and means responsive to the disappearance of the light collecting indicium in the selected channel from the last light collecting area for stopping said carriage.

6. A record feeding and printing device of the kind wherein printing is effected by recording a plurality of impressions on a single line and having, in combination, means for line spacing said record after each line of printing, means for long feeding the record after the line of printing, a control member having a light conducting spot therein operated in synchronism with the record feeding, means for initiating movement of the record, a light responsive member responsive to a light indication to provide an output signal, a light guide having an enlarged light collecting area disposed adjacent a portion of said control member to continuously monitor the travel of the light conducting spot as it moves thereby to said light responsive device, means responsive to the output signal from said light responsive member for operating said long feed means, and means responsive to the disappearance of the light conducting spot from the light collecting area for terminating the long feed operation.

7. Record feeding devices for cooperation with a printer wherein a printing cycle completes a line of print, means for short and long feeding the record between printing cycles, a control tape carrying light conducting spots therein, a light source for directing light through at least one of the spots, a long feed and a short feed light responsive member associated with said control tape for generating output signals when excited by a beam of light, a long feed and a short feed light guide, each light guide having an enlarged light input area disposed in alignment adjacent a portion of said control tape for conducting a light beam from any location within the input area to its related light responsive member, means for initiating movement of said record and control tape, said light conducting spot being operative when in the area covered by said long feed light guide to excite said long feed light sensitive member to generate an output signal, means responsive to said signal for operating said record feeding device and control tape under long feed conditions, means responsive to operation of said short feed light sensitive member as the control spot moves into the short feed area for terminating the long feed operation and for transferring to the short feed operation, and means for terminating the record feeding movement when the light conducting spot leaves the area interrogated by said short feed light sensitive member.

8. The combination as claimed in claim 7 including means for driving said record feeding means at the long feed rate after record feeding movement is initiated when the light conducting spot lies out of range of the areas interrogated by said light conducting guides.

9. The combination as claimed in claim 8 including means for interrupting operation of said printer when a long feed operation is initiated and the light conducting spot is not within the defined short and long feed areas.

10. The combination as claimed in claim 9 wherein the light conducting spot entering the area defined by the long feed light guide operates the related light responsive member to provide an output for actuating said interrupting means to reconnect the printer for operation.

11. A record feeding and printing mechanism wherein printing is effected by impressions side by side on a single line during printing cycles, in combination, a record feeding device, means for line spacing the record after each printing cycle, means for long feeding the record after a printing cycle, means under control of the printing mechanism for initiating a record feed, a multichannel control tape carrying control indicia within the channels, means for driving said control tape and said record in synchronism, means for selecting one of the control channels in said control tape to provide a light indication for the type of feeding operation, a stationary light sensitive member, a light guide disposed between said multichannel tape and light sensitive member, said light guide having an enlarged light collecting area disposed adjacent a portion of said control tape to continuously monitor the travel of the light conducting indicium in the selected channel to said light sensitive member when it lies within the enlarged light collecting area of said light guide, means associated with said light sensitive member for initiating a long feed operation when the control indicium in the selected channel is lying ahead of the light collecting area, and means under control of said long feed selecting means for delaying the beginning of the next printing cycle.

12. In combination, a printer having a plurality of spaced printing heads for impressing data on a record on the same line during a printing cycle; a multispeed record feeding device including means for line spacing and short feeding the record at a low speed between sets of printing cycles, the timing between said cycles being undisturbed, and for long feeding the record at a high speed; means under control of the printer for initiating the feeding of a record at the end of a printing cycle; a multichannel control tape associated with said record feeding device operative in synchronism with the record, said control tape having at least one channel with a light conducting control indicium therein; photoelectric means for interrogating an area of said control tape for the presence of the light conducting indicium; a light guide disposed between said control tape and photoelectric means, said light guide having an enlarged light collecting area disposed adjacent a portion of said control tape to continuously monitor the plurality of channels for the light conducting indicium to said photoelectric means; means for selecting the channel for interrogation, said photoelectric means being responsive, in the absence of the control indicium, for initiating a long feed operation; control means associated with said photoelectric means operative in response to the long feed indication for interrupting printer operation to prolong the normal interval between printing cycles; and means operative upon the appearance of the control indicium to the monitored area covered by said light guide for initiating the printer operation.

13. In a cyclically operated printer for printing a line of data on a record form having a plurality of character receiving positions in one cycle of operation, the combination of a multispeed carriage for controlling movement of the record to be printed at the completion of each complete printing cycle, carriage control means to cause operation of said carriage at a line space and low speed skip or at a high speed skip, a plurality of printing devices spaced at least two character receiving positions apart, means for supplying a line of data to the printer, means for selecting the characters in the data to be printed for each printing device, means for operating said printing devices to impress the selected data at their respective character receiving positions within a subcycle portion of the cycle of operation, means for shifting the printing devices to a second character receiving position after the first subcycle printing operation while said data selecting means is operative to select a second group of characters to be printed upon the next subcycle of printer operation, means operative by said printer at the end of a printing cycle to initiate carriage movement, said carriage control means including a multichannel control tape having light conducting control spots in the channels operated in synchronism with said carriage and record, a light for each channel, means for selectively energizing one of the channel lights, photoelectric cells for interrogating an area of said control tape for the presence of the light conducting spot, a light guide for each of said photoelectric cells having an enlarged light collecting area disposed adjacent a portion of said tape to continuously monitor the channels and transmit the light projecting through the control indicium, when within the area, to the related photoelectric cell, said photoelectric cells being operative through said carriage control means to advance said carriage and record at a low or a high speed, and means operative upon the absence of a light conducting spot in the selected channel to initiate a high speed skip operation and to interrupt printer operation for a time interval of one or more subsequent timed subcycles, said last-named means being operative as the control spot reaches the light collecting area for reconnecting the printer to initiate the operation of the next printing cycle at the beginning of the next timed interval subcycle.

14. In a cyclically operated printer for printing a line of data on a record having a plurality of impression receiving positions in a predetermined number of subcycles of operation, the combination of a plurality of printing devices spaced more than one impression receiving position apart to provide for a serial-parallel printing operation at a printing station, means for preselecting the order of the characters to be printed during printing subcycles, means for operating said printing devices to simultaneously impress the selected character at the subcycle rate, means for laterally shifting said printing devices to align the same with subsequent printing positions, said character selecting means and printing devices being operative during each printing subcycle to impress the desired data on the record, a multispeed record feeding carriage for controlling movement of the record past the printing station, means for advancing the record at line space speed at the completion of each printing cycle, a multichannel control tape having light conducting indicia therein operated in synchronism with said carriage, a channel light for each channel, means for selectively energizing one of said channel lights, a pair of light guides defining first and second enlarged areas covering a plurality of the channels for detecting the light conducting indicium in the selected channel, a photoelectric cell associated with each light guide, means responsive to the operation of the first of said photocells when the selected light conducting indicium is within the first area for operating said carriage at a low speed skip without interfering with printer operation, means responsive when the light conducting indicium is in the second area for operating said carriage at a high speed skip without interfering with printer operation, and means responsive when the light conducting indicium is at some location other than the first and second areas to operate the carriage at high speed and to suppress the next printing cycle, said last-named means being operative after the control indicium enters the second area for reconnecting the printer at the next timed interval subcycle to initiate the first printing subcycle of the next printing cycle.

15. In a cyclically operated printer for printing a line of data on a record having a plurality of impression receiving positions in a predetermined number of timed interval subcycles of operation, the combination of a plurality of printing devices spaced more than one impression receiving position apart to provide for a serial-parallel printing operation at a printing station, means for preselecting the order of the characters to be printed during printing subcycles, means for operating said printing devices to simultaneously impress the selected characters at the subcycle rate, means for laterally shifting said printing devices to align the same with subsequent printing positions, said character selecting means and printing devices being operative during each printing subcycle to impress the desired data on the record, drive means for said printing devices, clutch means between said drive means and said printer to interrupt operation of the latter, a multispeed carriage for feeding continuous forms to and from the printing station for line printing, drive means for said carriage, means for connecting said carriage drive means to said carriage to advance the forms at a low speed, means for spacing the forms under low speed conditions, means connecting said carriage drive means and carriage to advance the forms at a high speed, a multichannel control tape having light conducting control perforations therein corresponding to the starting lines on the form for selectively controlling the operation of said carriage, a channel light for each channel, means for energizing the light in the controlling channel in said control tape at the end of a printing cycle, a first photoelectric cell, a first light guide having an enlarged light collecting surface embracing the channels defining a first area and responsive to the location of the light conducting perforation in the selected channel appearing therein for directing the light to said first photoelectric cell to provide an output signal, means operated by said signal to advance the forms to a predetermined print receiving line at low speed without interfering with normal printing operation, a second photoelectric cell, a second light guide having an enlarged light collecting surface aligned ahead of the first area to encompass a second area of the channels and responsive to the light conducting perforation appearing therein for directing the light to said second photoelectric cell to provide an output signal, means operated by said output signal for operating the carriage at high speed to advance the form to the predetermined print receiving line without interrupting normal printer operation, means responsive when the light conducting perforation is at some location other than the first and second areas to advance the form at high speed and interrupt the next printing cycle, said last-named means being operative after the selected control perforation enters the second sensing area for reconnecting the printer at the next timed interval subcycle to initiate the first printing subcycle of the next printing cycle, means for decelerating the high speed operation of said carriage by reconnecting the same to said low speed means when the light conducting perforation enters the first area, and means for stopping said carriage when the light conducting perforation leaves the first area.

References Cited in the file of this patent
UNITED STATES PATENTS

| | | |
|---|---|---|
| 2,031,503 | Rainey | Feb. 18, 1936 |
| 2,057,773 | Finch | Oct. 20, 1936 |
| 2,181,992 | Ghertman | Dec. 5, 1939 |
| 2,246,968 | Antrim | June 24, 1941 |
| 2,268,498 | Bryce | Dec. 30, 1941 |
| 2,297,743 | Carroll | Oct. 6, 1942 |
| 2,482,242 | Brustman | Sept. 20, 1949 |
| 2,531,885 | Mills | Nov. 28, 1950 |
| 2,640,160 | Collins | May 26, 1953 |
| 2,695,964 | Schepker | Mar. 30, 1954 |
| 2,687,253 | McMillan | Aug. 24, 1954 |
| 2,725,786 | McCarthy | Dec. 6, 1955 |
| 2,765,411 | Kerr | Oct. 2, 1956 |